US005210649A

United States Patent [19]

Weissmann

[11] Patent Number: 5,210,649

[45] Date of Patent: May 11, 1993

[54] MOUNT FOR AN OPTICAL ELEMENT

[75] Inventor: Gerhrad Weissmann, Villingen-Schwenningen, Fed. Rep. of Germany

[73] Assignee: Deutsche Thomson-Brandt GmbH, Villingen-Schwenningen, Fed. Rep. of Germany

[21] Appl. No.: 827,045

[22] Filed: Jan. 28, 1992

[30] Foreign Application Priority Data

Jul. 21, 1989 [DE] Fed. Rep. of Germany ....... 3924189

[51] Int. Cl.5 ............ G02B 7/02

[52] U.S. Cl. ............ 359/819; 359/820

[58] Field of Search ............ 359/819, 820, 822, 827, 359/808, 811, 812, 813, 814, 823, 824

[56] References Cited

U.S. PATENT DOCUMENTS

| | | | |
|---|---|---|---|
| 3,753,611 | 8/1973 | Ebbesen | 359/813 |
| 4,258,982 | 3/1981 | Skinner et al. | 359/819 |
| 4,812,015 | 3/1989 | Iizuka et al. | 359/819 |
| 4,850,674 | 7/1989 | Hasselskog | 359/820 |
| 5,050,963 | 9/1991 | Murakami | 359/819 |

FOREIGN PATENT DOCUMENTS

| | | |
|---|---|---|
| 57-191838 | 11/1982 | Japan . |
| 57-195339 | 12/1982 | Japan . |
| 64-1123 | 1/1989 | Japan . |

*Primary Examiner*—Loha Ben

*Attorney, Agent, or Firm*—J. S. Tripoli; E. P. Herrmann; L. L. Hallacher

[57] ABSTRACT

A mount for mounting a lens in an optical scanning device includes a tubular portion having a first surface which rotatably supports the lens. A second surface includes a plurality of arcuate supports. An annular spring is supported by the arcuate supports and is bent at the points of contact with the supports to extend outwardly beyond the supports to bias the mount and the lens against the scanning device in which it is mounted.

4 Claims, 1 Drawing Sheet

MOUNT FOR AN OPTICAL ELEMENT

This is a continuation of PCT application PCT/EP 90/01037 filed Jun. 29, 1990 by Gerhard Weissmann and titled "Mount For An Optical Element".

This invention is directed to a mount for an optical element of the type used in scanning devices, such as a CD player, which utilize an optical pick-up. The mount supports a lens, or optical grid, in the scanning device.

An optical scanning head is described in JP-A 64 001123. A lens is contained in a tube and is supported inside the scanning head. A coil spring, which is supported at one end of the tube, acts against one face of the lens and forces the other face of the lens against the other end of the tube. This scanning head is composed of several parts and its fabrication thus requires several difficult and expensive process steps. The inventive mount can be manufactured in simple fabrication steps and is easily inserted into the optical scanning device.

Figure 1:
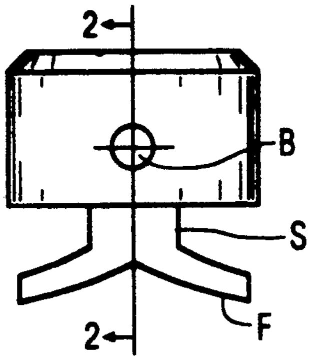
FIG. 1 is a side view of a preferred embodiment.
Figure 2:
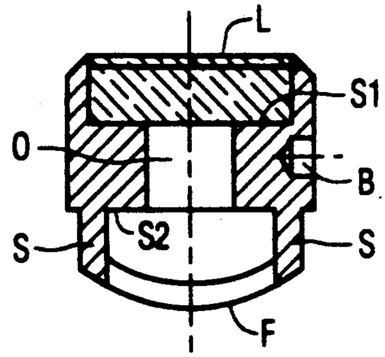
FIG. 2 is a section along line 2—2 of FIG. 1.

In FIGS. 1 and 2, an optical element L, for example an optical grid or lens, is fitted onto one face S1 of a cylinder-shaped mount. A ring-shaped (annular) spring F is supported by two supports S, which are attached to the other face S2 of the mount. The spring F is bent outwardly away from the lens L at the point where it contacts the supports S to extend beyond the supports S and bias the lens L in a manner described hereinafter. The supports S are arcuate and their inside surfaces lie on a circle having a diameter substantially equal to that of the annular spring F. The surfaces therefore firmly support the annular spring F. A hole B is located on the side, the purpose of which is explained hereinafter.

A cross section taken along line 2—2 of FIG. 1 is shown in FIG. 2. The lens L is fitted into a recess which is provided in the face S1. A longitudinal bore 0 is centered in the mount and allows light to pass through the mount.

Figure 3:
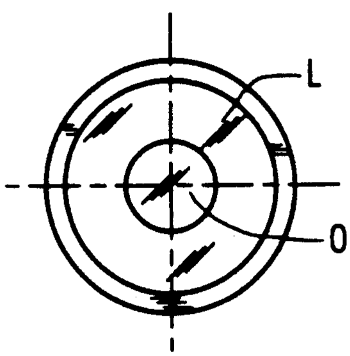
FIG. 3 is a top view of the FIG. 1 embodiment.
Figure 4:
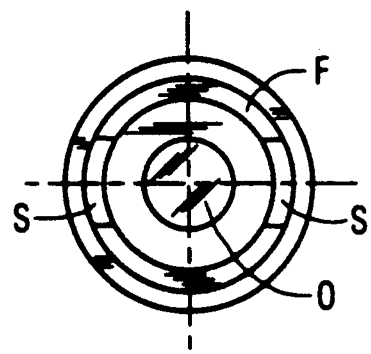
FIG. 4 is a bottom view of the FIG. 1 embodiment.
Figure 5:
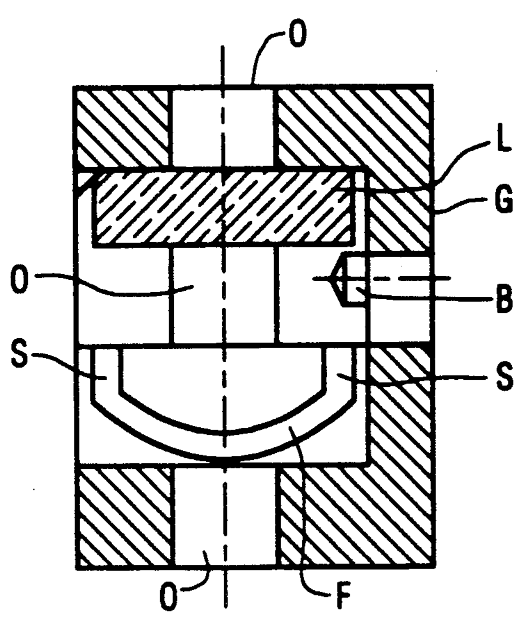
FIG. 5 shows the embodiment of FIG. 1 housed in a scanning device.

FIG. 3 shows the face S1 of the mount with the optical element L in place. FIG. 4 shows the other face S2 of the mount with the annular spring F in place. In FIG. 5, the mount is fitted into a housing G. The annular spring F presses the lens L and the face S1 of the mount against one surface of the housing G, to hold the mount in place without the need for an additional holding or clamping device. Also, because the annular spring F is curved, the mount and the lens L can be rotated within the housing G, and the optical lens L can be adjusted. The hole B is provided to allow adjustment of the lens by means of an eccentric tool. An important advantage of the invention is the fact that the mount can be manufactured of plastic using injection-moulding techniques. The fabrication costs are therefore substantially less than they are for a mount which is assembled from several parts.

The invention is suitable for optical scanning devices, such as CD-players, video record players, DRAW-disc-players or magneto-optical recording/reproducing players.

I claim:

1. A mount for mounting a lens in an optical scanning device comprising:

a tubular portion having a first surface for rotatably supporting said lens and a second surface including a plurality of arcuate supports;

an annular spring supported by said arcuate supports, said spring being bent at the points of contact with said supports to extend outwardly beyond said supports to bias said mount and said lens against said scanning device.

2. The mount of claim 1 wherein said points of contact lie on the circumference of a circle having substantially the same diameter as the diameter of said annular spring.

3. The mount of claim 2 further including a hole in the side of said mount for adjusting said lens.

4. The mount of claim 3 wherein said mount and said supports are formed from a single piece of material.

* * * * *